United States Patent
Lor et al.

(10) Patent No.: US 10,935,137 B2
(45) Date of Patent: Mar. 2, 2021

(54) SEAL ASSEMBLY, ROLLER BEARING COMPRISING SUCH AN ASSEMBLY, AND METHOD FOR MANUFACTURING THIS ASSEMBLY

(71) Applicant: HUTCHINSON, Paris (FR)

(72) Inventors: Jean Lor, Le Bourg d'Ire (FR); Valérie Postec, La Roche (FR); Stéphane Chagneau, Nyoiseau (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 16/346,964

(22) PCT Filed: Nov. 10, 2016

(86) PCT No.: PCT/FR2016/052933
§ 371 (c)(1),
(2) Date: May 2, 2019

(87) PCT Pub. No.: WO2018/087433
PCT Pub. Date: May 17, 2018

(65) Prior Publication Data
US 2019/0257427 A1 Aug. 22, 2019

(51) Int. Cl.
*F16J 15/324* (2016.01)
*F16C 33/78* (2006.01)
(Continued)

(52) U.S. Cl.
CPC .......... *F16J 15/324* (2013.01); *F16C 19/186* (2013.01); *F16C 33/581* (2013.01);
(Continued)

(58) Field of Classification Search
CPC .................. F16C 33/583; F16C 33/7823; F16C 33/7826; F16C 33/7876; F16C 33/7883; F16J 15/324; F16J 15/3264
See application file for complete search history.

(56) References Cited

U.S. PATENT DOCUMENTS 7,926,815 B2 * 4/2011 Niebling ............. F16C 33/7879
277/551
2003/0207657 A1 11/2003 Domanski
(Continued)

FOREIGN PATENT DOCUMENTS

EP  1830086 A1  5/2007
JP  09317774 A  12/1997
(Continued)

OTHER PUBLICATIONS

International Search Report for Application No. PCT/FR2016/052933; dated Jul. 26, 2017.

*Primary Examiner* — James Pilkington
(74) *Attorney, Agent, or Firm* — von Briesen & Roper, s.c.

(57) ABSTRACT

The seal assembly comprising a fixed element, a rotating element, and a seal member comprising a stiff annular reinforcement and a seal of an elastic material and in contact with a sliding surface. The sliding surface has an arithmetic mean roughness greater than or equal to 0.15 μm and less than 0.5 μm. The sliding surface has a roughness ratio greater than or equal to one. The roughness ratio is the ratio of a first parameter corresponding to a quantity of valleys to a second parameter corresponding to a quantity of peaks over the sliding surface.

8 Claims, 3 Drawing Sheets

(51) Int. Cl.
   *F16J 15/3264* (2016.01)
   *F16C 19/18* (2006.01)
   *F16C 33/58* (2006.01)

(52) U.S. Cl.
   CPC ...... *F16C 33/7823* (2013.01); *F16C 33/7826* (2013.01); *F16C 33/7876* (2013.01); *F16C 33/7883* (2013.01); *F16J 15/3264* (2013.01); *F16C 2240/54* (2013.01); *F16C 2326/02* (2013.01)

(56) References Cited

U.S. PATENT DOCUMENTS

| | | | | |
|---|---|---|---|---|
| 2007/0297901 | A1* | 12/2007 | Iketani | F16C 33/78 415/231 |
| 2008/0019624 | A1 | 1/2008 | Kubo | |
| 2008/0106041 | A1* | 5/2008 | Shibayama | F16C 33/7883 277/399 |
| 2010/0272382 | A1* | 10/2010 | Yamamoto | F16C 33/7883 384/486 |
| 2011/0017006 | A1* | 1/2011 | Wern | C21D 9/32 74/457 |
| 2014/0225332 | A1* | 8/2014 | Baart | F16C 33/7876 277/549 |
| 2016/0146348 | A1 | 5/2016 | van Opstal | |

FOREIGN PATENT DOCUMENTS

| | | |
|---|---|---|
| JP | 2004353710 A | 12/2004 |
| JP | 2012193768 A | 10/2012 |
| JP | 2016148420 A | 8/2016 |
| WO | WO 2012/161259 A1 | 11/2012 |

* cited by examiner

SEAL ASSEMBLY, ROLLER BEARING COMPRISING SUCH AN ASSEMBLY, AND METHOD FOR MANUFACTURING THIS ASSEMBLY

CROSS-REFERENCE TO RELATED APPLICATION

This Application is a 35 USC § 371 US National Stage filing of International Application No. PCT/FR2016/052933 filed on Nov. 10, 2016.

FIELD OF THE DISCLOSURE

The present invention relates to seal assemblies.

BACKGROUND OF THE DISCLOSURE

More specifically, the invention relates to a seal assembly comprising:
  a fixed element;
  a rotating element intended to be rotatable relative to the fixed element around an axis of rotation; and
  a seal member comprising a stiff annular reinforcement mounted securely on one element among the fixed element and the rotating element, and a seal secured to the reinforcement, where said seal is made of an elastic material and is in contact with a sliding surface of the other element among the fixed element and the rotating element.

Many examples of this type of assembly are known.

Such a seal assembly is for example used in a bearing, and for example in an automobile wheel bearing. With this seal assembly in particular, a lubricating fluid can be retained inside the bearing to provide operation thereof with low friction.

Unfortunately, this seal assembly contributes to increasing the friction, meaning the rotational frictional torque. This phenomenon is one part of the mechanical energy losses during rotation. To reduce these losses, low friction solutions are sought which also allow maintaining the seal.

The document EP 1,830,086 describes an example of such a seal assembly in which the sliding surface has an arithmetic mean roughness (Ra) greater than or equal to 0.5 µm in order to create valleys, and a grease having a kinematic viscosity included between 10 and 60 mm$^2$/s at 40° C. is used.

SUMMARY OF THE DISCLOSURE

The goal of the present invention is to improve seal assemblies of this type, in particular for reducing the frictional torque while retaining an excellent seal.

For this purpose, the seal assembly is characterized in that:
  The sliding surface has an arithmetic mean roughness (Ra) greater than or equal to 0.15 µm and less than 0.5 µm; and
  the sliding surface has a roughness ratio (R) greater than or equal to one, where said roughness ratio (R) is the ratio of a first parameter corresponding to a quantity of valleys of a profile over the sliding surface to a second parameter corresponding to a quantity of peaks of said profile over the sliding surface.

Because of these arrangements, it is assured that the sliding surface is sufficiently smooth and lubricated to avoid abrasion of the seal. Thus a very reduced frictional torque between the fixed element and the rotating element is obtained. This frictional torque has a more consistent value (repeatable) for a plurality of parts.

These arrangements also have the effect of reducing the wear of the contact surfaces and in particular the seal, and increasing the life of the seal assembly.

These arrangements also have the effect of maintaining the seal performance and improving the repeatability of this seal performance over a plurality of parts.

In various embodiments of the seal assembly, use could be made of one and/or another of the following arrangements.

According to an aspect, the first parameter is the Rvk parameter and the second parameter is the Rpk parameter, where said Rvk and Rpk parameters are defined and determined according to the standard ISO 13565.

According to an aspect, the roughness ratio is greater than or equal to 1.5, and preferably greater than or equal to 2.

According to an aspect, the arithmetic mean roughness is greater than or equal to 0.2 µm and less than 0.3 µm.

According to an aspect, the assembly further comprises an annular ring, secured to the other element, and the sliding surface is formed on said annular ring.

According to an aspect:
  the annular ring comprises a cylindrical portion mounted secured to the other element among the fixed element and the rotating element, and a flange portion which extends radially relative to the axis of rotation from one end of said cylindrical portion;
  the seal comprises a first lip which extends radially from the annular reinforcement out to the cylindrical portion in order to be in contact with the sliding surface belonging to said cylindrical portion, and a second lip which extends axially from the annular reinforcement to the flange portion in order to be in contact with a sliding surface belonging to said flange portion;
  said annular ring and said first and second seal lips define an internal volume.

According to an aspect, the inner volume is at least partially filled with grease.

According to an aspect, the grease has a kinematic viscosity at 40° C. included between 5 centiStokes and 40 centiStokes.

The invention also relates to a roller bearing comprising a seal assembly according to the preceding characteristics and rolling bodies arranged in a rolling space to allow relative rotation of the rotating element relative to the fixed element around the axis of rotation.

The invention also relates to a method for manufacturing a seal assembly comprising the following steps:
  a) providing a seal assembly comprising:
  a fixed element;
  a rotating element intended to be rotatable relative to the fixed element around an axis of rotation;
  a seal member comprising a stiff annular reinforcement mounted securely on one element among the fixed element and the rotating element, and a seal secured to the reinforcement, where said seal is made of an elastic material and is in contact with a sliding surface of the other element among the fixed element and the rotating element; and
  b) the sliding surface is treated by at least one of the following substeps:
    a shot blasting substep for forming valleys on the sliding surface; and
    a polishing substep for at least partially eliminating the peaks on the sliding surface.

In various embodiments of the method, use could be made of one and/or another of the following arrangements.

According to an aspect, the shot blasting substep consists of impacting the sliding surface with glass beads with a diameter included between 50 µm and 423 µm for a time included between 5 minutes and 15 minutes.

According to an aspect, the polishing substep consists of vibrating the sliding surface in the presence of finishing media.

According to an aspect, the polishing substep is done for a time included between 15 minutes and 45 minutes.

According to an aspect, the seal assembly further comprises a ring that is annular and intended to be secured to the other element, and said sliding surface is formed on said annular ring.

BRIEF DESCRIPTION OF THE DRAWINGS

Other features and advantages of the invention will become apparent during the following description of one of the embodiments thereof, given as a nonlimiting example, with reference to the attached drawings.

In the drawings.

In the various figures, the same numerical references designate identical or similar items.

DETAILED DESCRIPTION OF THE DISCLOSURE

Figure 1:
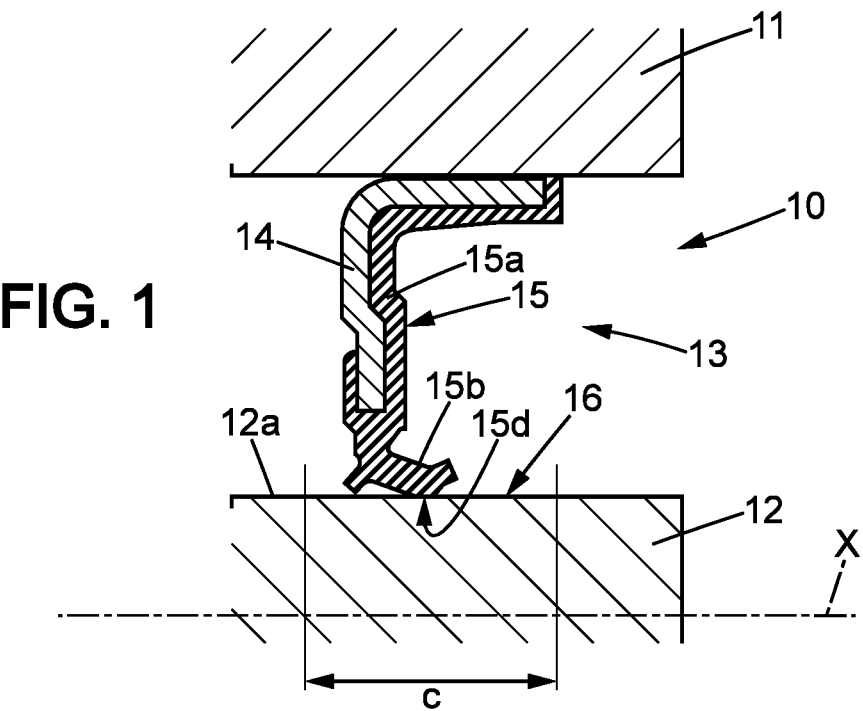
FIG. 1 is a transverse section of a seal assembly according to a first embodiment of the invention.

FIG. 1 shows a first embodiment of a seal assembly 10 which comprises:
- a fixed element 11;
- a rotating element 12 rotatable relative to the fixed element around an axis of rotation X; and
- a seal member 13 comprising a stiff annular reinforcement 14 and a seal 15 secured to the reinforcement, where said seal 15 is made of an elastic material and is in contact with the sliding surface 16.

The reinforcement 14 is mounted securely on one element among the fixed element 11 and the rotating element 12.

The sliding surface 16 is connected to the other element among the fixed element 11 and the rotating element 12.

In particular, the fixed element 11 can be an outer element, i.e. farthest from the axis of rotation X, i.e. located around the rotating element 12 which is then an inner element. This is the case of using a rotating element 12 which is a turning shaft (FIG. 1).

On the other hand, the fixed element 11 can be an inner element, i.e. closest to the axis of rotation X, i.e. located inside the rotating element which is then an outer element.

In the interest of simplification of the present description, it will now be considered that the reinforcement 14 is connected to the outer fixed element 11, and that the sliding surface 16 is connected to the other element, i.e. the inner rotating element 12, but of course the other use is also appropriate for the present invention.

The seal 15 comprises:
- an attachment portion 15a which is attached to at least one reinforcement surface 14, for example by overmolding on said reinforcement 14, and advantageously with a prior adhesive coating on said reinforcement surface; and
- a first lip 15b which extend radially from the annular reinforcement 14 to the sliding surface 16 in order to be in contact with this sliding surface 16 on one end of the lip 15d.

In this embodiment of the FIG. 1, the sliding surface 16 is an integral part of the rotating element 12, in particular of the outer cylindrical surface 12a of the rotating element 12. This sliding surface 16 corresponds to a portion of the cylindrical surface 12a which is annular and which extends along a length c in the longitudinal direction of the axis of rotation X. The sliding surface portion 16 is positioned corresponding with the seal member 13 (in longitudinal position) so that the end of the lip 15d of the seal 15 is in contact with said sliding surface 16.

As a variant, the sliding surface 16 is formed on an annular type ring (not shown) and secured to the other element (rotating element 12). For example, this ring is a metal part. It is located between the rotating element 12 and the seal 15. The lip end 15d of the seal 15 is in sliding type contact with an outer surface of this ring which turns with the rotating element 12.

According to the invention, the sliding surface 16 has the following characteristics:
- The sliding surface 16 has an arithmetic mean roughness Ra greater than or equal to 0.15 µm and less than 0.5 µm; and
- the sliding surface 16 has a roughness ratio R greater than or equal to one, where said roughness ratio R is the ratio of a first parameter corresponding to a quantity of valleys of a profile over the sliding surface 16 to a second parameter corresponding to a quantity of peaks of said profile over the sliding surface 16.

According to a preferred variant, the first parameter is the Rvk parameter and the second parameter is the Rpk parameter, where said Rvk and Rpk parameters are defined and determined according to the standard ISO 13565; meaning:

$$R = \frac{Rvk}{Rpk}.$$

Details on the roughness standards will be given later.

Because of the various preceding arrangements, it is assured that the sliding surface is sufficiently smooth and lubricated to avoid abrasion of the seal and to get a reduced frictional torque. The seal performance of the seal assembly is retained. Wear on the seal is reduced and the life of the assembly is improved.

Figure 2:
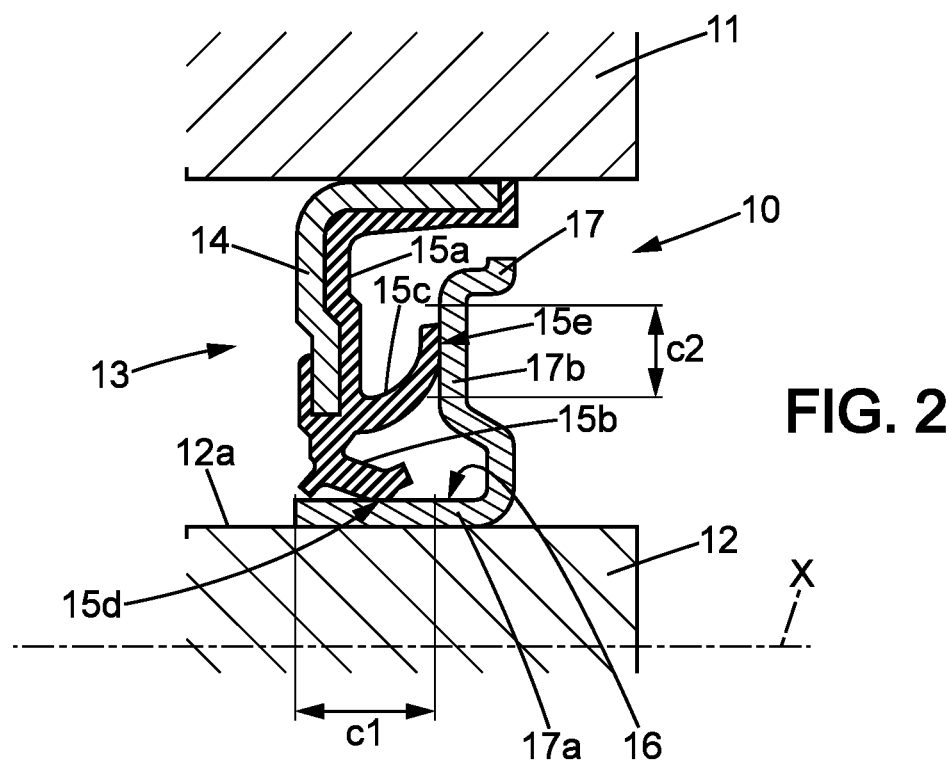
FIG. 2 is a transverse section of a seal assembly according to a second embodiment of the invention.

FIG. 2 shows a second embodiment of the seal assembly 10 which comprises the same elements as the seal assembly from FIG. 1.

The seal assembly 10 further comprises an annular ring 17 which is secured to the rotating element 12 and which is located between the rotating element 12 and the seal 15. The lip end 15d of the seal 15 is in sliding type contact with at least one surface of this ring which turns with the rotating element 12.

In the second embodiment, more specifically, the annular ring 17 comprises:
- a cylindrical portion 17a mounted securely to the rotating element 12, for example by tightened fitting on the cylindrical surface 12a of said rotating element 12; and
- a flange portion 17b which extends from one end of said cylindrical portion 17b radially relative to the axis of rotation X.

The seal 15 comprises, as in the first embodiment from FIG. 1:
- an attachment portion 15a which is attached to at least one reinforcement surface 14; and
- a first lip 15b which extend radially from the annular reinforcement 14 to the sliding surface 16 in order to be in contact with this sliding surface 16 on one end of the lip 15d.

The seal 15 also comprises in the present second embodiment a second lip 15c which extends axially from the annular reinforcement 14 to the flange portion 17b so as to be in contact at one end of the lip 15e with the second part of the sliding surface 16 belonging to said flange portion 17b.

The sliding surface 16 therefore here makes up an integral part of the annular ring 17 attached to the rotating element 12. This sliding surface 16 corresponds for example to all or part of the outer surface of the annular ring 17 directed towards the reinforcement 14.

The sliding surface 16 comprises, for example:
- a first part of the cylinder portion 17a of the annular ring 17, where said first part extends over a length c1 in the longitudinal direction of the axis of rotation X and in correspondence (facing) with the first lip 15a;
- a second part of the flange portion 17b the annular ring 17, where said second part extends over a length c2 in a direction substantially perpendicular to the longitudinal direction of the axis of rotation X and in correspondence (facing) with the second lip 15c.

Thus, the ends 15d, 15e of the first lip and the second lip are in sliding contact with the sliding surface 16.

According to the invention, the sliding surface 16 has the following characteristics:
- The sliding surface 16 has an arithmetic mean roughness Ra greater than or equal to 0.15 μm and less than 0.5 μm; and
- the sliding surface 16 has a roughness ratio R greater than or equal to one, where said roughness ratio R is the ratio of a first parameter corresponding to a quantity of valleys of a profile over the sliding surface 16 to a second parameter corresponding to a quantity of peaks of said profile over the sliding surface 16.

According to a preferred variant, the first parameter is the Rvk parameter and the second parameter is the Rpk parameter, where said Rvk and Rpk parameters are defined and determined according to the standard ISO 13565; meaning:

$$R = \frac{Rvk}{Rpk}.$$

Details on the roughness standards will be given later.

The annular ring 17 and the first and second seal lips 15b, 15c then define an annular volume inside the seal assembly. This inner volume is at least partially filled with grease. Thus, the valleys of the sliding surface 16 will be filled with said grease, and the frictional torque reduced.

The grease preferably has a kinematic viscosity at 40° C. included between 5 centiStokes and 40 centiStokes.

Because of the various preceding arrangements, it is assured that the sliding surface is sufficiently smooth the lubricated to avoid abrasion of the seal and to get a reduced frictional torque. The seal performance of the seal assembly is retained. Wear on the seal is reduced and the life of the assembly is improved.

As a variant, the annular ring 17 can be provided with an encoding element (not shown), for example magnetic type, such as an elasto-ferrite encoder. These encoding elements usually have alternating south and north magnetic poles. A sensor element is then capable of generating a signal with which to determine the rotational position and/or speed of the rotating element 12 relative to the fixed element 11.

According to any one of the preceding embodiments, the following characteristics are possible.

The roughness ratio R can be greater than or equal to 1.5, and for example greater than or equal to 2, which means that the sliding surface 16 comprises a volume or quantity of valleys much larger than of peaks. Thus, the sliding surface is smooth and well lubricated. The frictional torque is then reduced.

The arithmetic mean roughness Ra is in a reduced range, meaning greater than or equal to 0.2 μm and less than 0.3 μm. This way, a smoother surface which has a reduced frictional torque is possible.

We are now going to give explanations about the roughness standards used in the definitions of various embodiments according to the invention.

Figure 3:
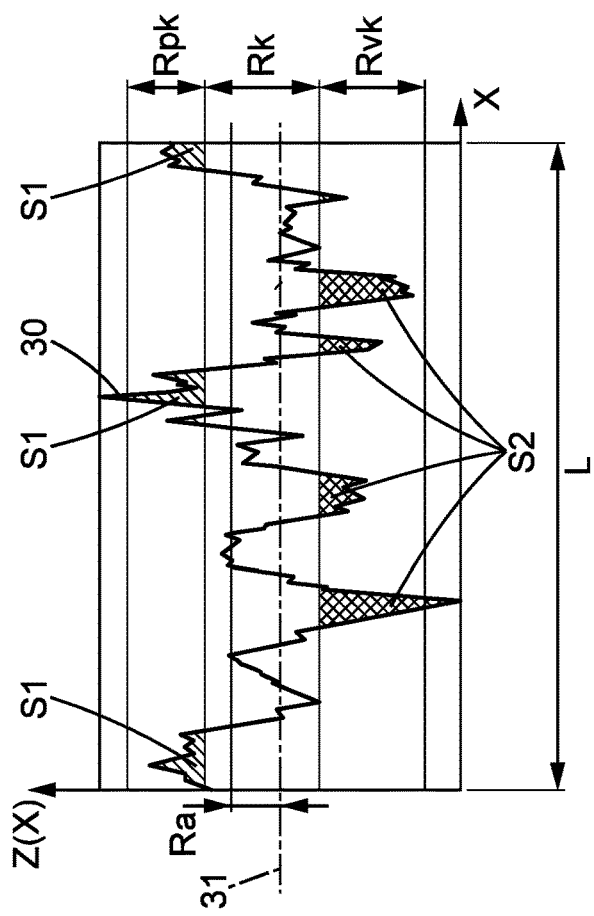
FIG. 3 is a curve of a profile of a line on a sliding surface.

FIG. 3 shows a sample profile 30 of the surface; this profile was measured with an appropriate device, such as a surface analyzer. The profile 30 is the succession of heights z(x) of the surface measured along an abscissa x of a line on the surface, extending over a length L.

The mean line 31 is a horizontal line median between the peaks and the valleys of the profile. This line is for example defined by the ISO 13565-1 standard filtering process.

The arithmetic mean roughness Ra is defined and determined, preferably, according to the ISO 4287 standard. This arithmetic mean roughness Ra is the arithmetic mean of the absolute values of the deviations from the mean line 31 of the profile 30. In particular, the arithmetic mean roughness Ra is usually calculated by:

$$Ra = \int_0^L |z(x)| \cdot dx$$

where
z(x) is the deviation of the profile 30 from the average line 31;
x is the abscissa; and
L is the length of the line on the surface or of the mean line.

Finally, on this FIG. 3, the peaks and valleys of the profile 30 have hatching to show their importance (quantity).

Figure 4:
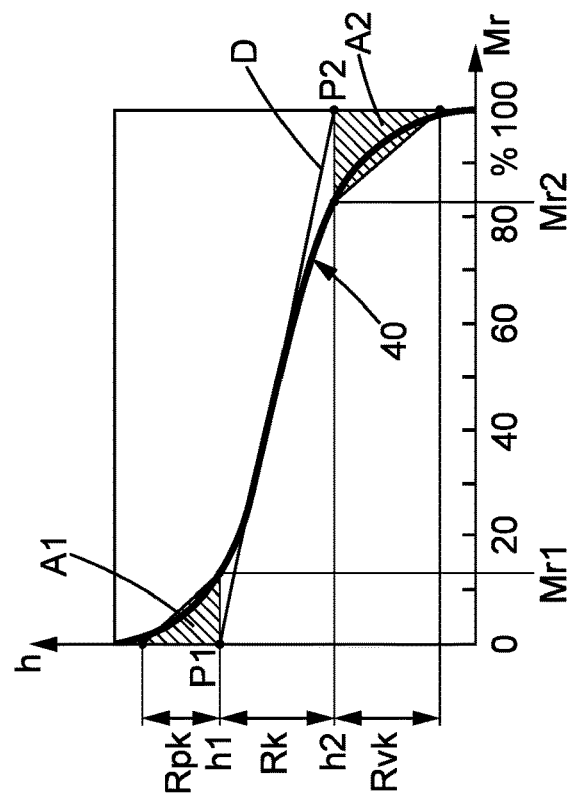
FIG. 4 is a length rate curve covering the profile from FIG. 3.

The ISO 13565-2 standard explains the definitions of the Rvk parameter and Rpk parameter. These parameters are determined by the bearing length ratio curve 40 shown in FIG. 4 opposite the profile 30 from FIG. 3. This curve is also called the Abbott-Firestone curve. The bearing length ratio is the ratio in percent of the sum of the bearing lengths from the profile 30 at a height h (horizontal segments of matter at a height h) to the total length L.

The straight-line equivalent D is determined by least-squares in a central zone of the bearing length ratio curve 40. This central zone represents 40% of the points from the profile. The equivalent straight line D cuts the ordinate axis at 0% at a first point P1 and cuts the ordinate axis at 100% at a second point P2. In this way, the profile 30 can be separated into three zones:
- a zone with peaks located at a height h1 greater than the height of the first point P1;
- a zone with valleys located at a height h2 less than the height of the second point P2; and
- a reduced peak profile zone with profile points having a height included between the height h1 and the height h2.

A first right triangle A1 is then traced on the bearing length ratio curve 40 having a base extending horizontally between the first point P1 and the bearing length ratio curve 40 and a lateral side which extends on the ordinate axis (at 0%) upward from the first point P1 over a height Rpk such that the surface area of said first right triangle A1 is equal to the surface area of the zone of the peaks S1 shown in FIG. 3.

A second right triangle A2 is then traced on the bearing length ratio curve 40 having a base extending horizontally between the second point P2 and the bearing length ratio curve 40 and a lateral side which extends on the ordinate axis (at 100%) downward from the second point P2 over a height Rvk such that the surface area of said second right triangle A2 is equal to the surface area of the zone of the valleys S2 shown in FIG. 3.

The parameter Rpk is the height of the first right triangle A1. This parameter Rpk therefore quantifies a quantity of peaks of the profile 30.

The parameter Rvk is the height of the second right triangle A2. This parameter Rvk therefore quantifies a quantity of valleys of the profile 30.

The arithmetic mean roughness Ra and the parameters Rpk and Rvk are advantageously used to precisely define the characteristics of the sliding surface 16 of the seal assembly 10 according to the invention.

Figure 5:
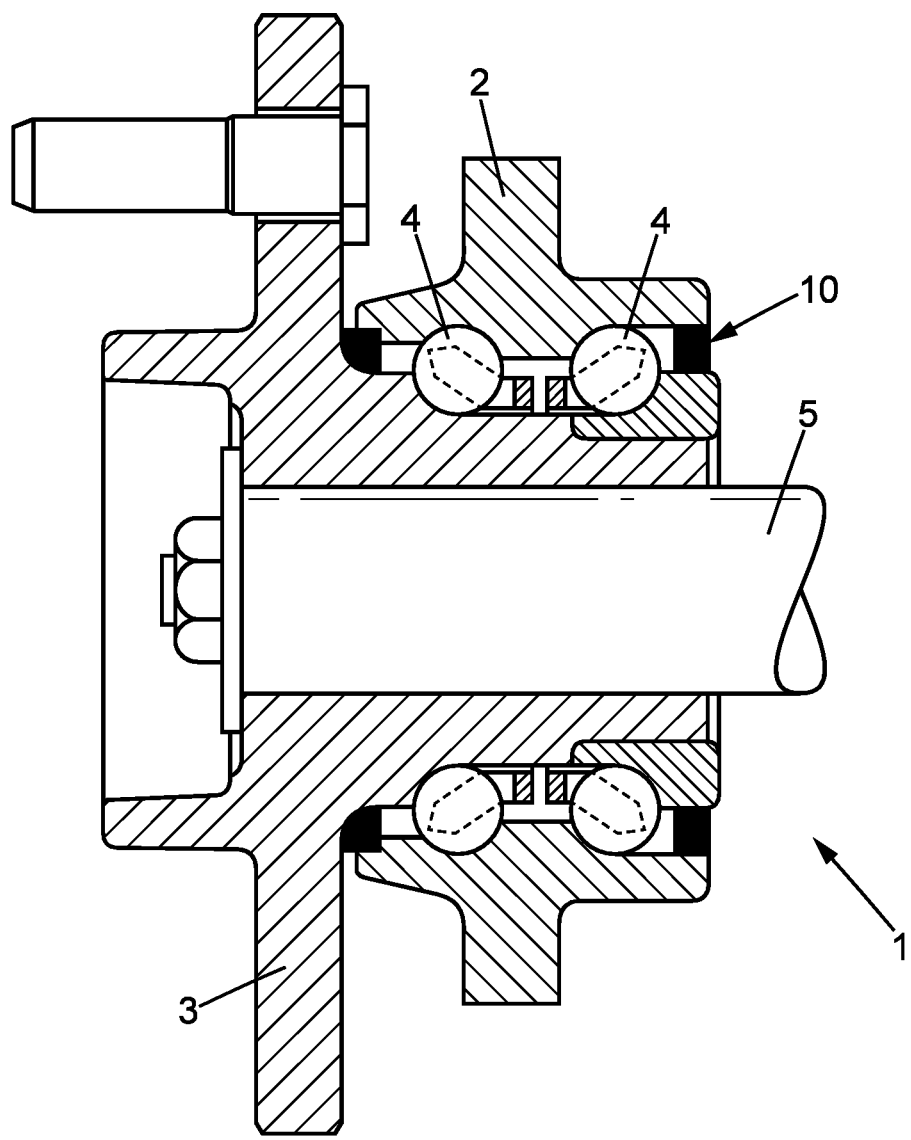
FIG. 5 is a roller bearing comprising a seal assembly according to the invention.

FIG. 5 shows a roller bearing 1 comprising on at least one side a sealed assembly 10 such as described above in order to assure the seal of the space inside said roller bearing. The roller bearing is for example an automobile roller bearing and more specifically for example an automobile wheel roller bearing, as is shown in FIG. 5.

This roller bearing 1 comprises in particular:
- a fixed member 2;
- a rotating member 3 driven in rotation by a shaft 5 and on which is attached, for example, a vehicle wheel; and
- rolling bodies 4 arranged in the roller space 4e formed between the fixed member 2 and the rotating member 3 in order to allow the relative rotation of the rotating member 3 relative to the fixed member 2 around the axis of rotation X, while taking up significant forces between the fixed member and the rotating member.

The fixed element 11 of the seal assembly 10 is either the fixed member 2 directly or is attached onto said fixed member 2 of the roller bearing 1.

The rotating element 12 of the seal assembly 10 is either the rotating member 3 directly or is attached onto said rotating member 3 of the roller bearing 1.

The rolling bodies 4 can be balls or rollers or any other known type.

Because of the seal assembly 10 according to the invention, the roller bearing 1 has a smaller frictional torque than the prior art. A vehicle equipped with such devices will therefore consume less energy to move forward.

The seal assembly 10 can be manufactured according to the following manufacturing method:
a) providing a seal assembly 10 comprising:
  a fixed element 11;
  a rotating element 12 intended to be rotatable relative to the fixed element around an axis of rotation;
  a seal member 13 comprising a annular reinforcement 14 mounted securely on one element among the fixed element and the rotating element, and a seal 15 secured to the reinforcement, where said seal 15 is made of an elastic material and is intended to be in contact with a sliding surface 16 of the other element among the fixed element and the rotating element; and
b) the sliding surface is treated by at least one of the following substeps:
  a shot blasting substep for forming valleys on the sliding surface; and
  a polishing substep for at least partially eliminating the peaks on the sliding surface.

The shot blasting substep consists for example of impacting the sliding surface 16 (i.e. the part or element comprising said sliding surface) with metal or glass beads or other.

For example, for this shot blasting glass beads with a diameter included between 50 μm and 423 μm are used for a time included between 5 minutes and 15 minutes.

The shot blasting forms peaks and valleys on the sliding surface 16. In particular, the resulting arithmetic mean roughness Ra depends on the characteristics of this shot blasting substep.

The polishing or finishing substep consists of vibrating the sliding surface 16 (i.e. the part or element comprising said sliding surface) in the presence of finishing media. A vibrating machine is used for this purpose, such as a vibrating bowl or Spiratron®.

The finishing media are for example pieces made up of an abrasive material, and for example ceramic or stone. These finishing media are for example spherical or cylindrical or prismatic (e.g. cubic or tetrahedral) shape. These finishing media are suited (chosen) for polishing all parts of the parts to be treated.

The finishing media are for example cylinders having a diameter included between 2 mm and 8 mm, and having a length included between 5 mm and 15 mm.

The finishing media could have dimensions in each direction (X, Y, Z) included between 2 mm and 15 mm.

Further, the polishing substep is done for a time included between 15 minutes and 45 minutes.

The finishing media erode the upper part of the sliding surface 16 to reduce the quantity of peaks from the profile of this sliding surface 16. Thus, the process can reduce the quantity of peaks relative to the quantity of valleys.

In particular, with this polishing or finishing substep a roughness ratio R such as defined above greater than equal to 1, or greater than equal to 1.5 or 2 if that is desired, can be obtained.

Consequently, with the manufacturing process described above, and in particular because of the step of treatment of the sliding surface 16, the preferred roughness characteristics can be achieved for the sliding surface 16 of the seal assembly 10. The sliding surface 16 is therefore treated to have an arithmetic mean roughness (Ra) greater than or equal to 0.15 μm and less than 0.5 μm, and a roughness ratio (R) greater than or equal to one; where the roughness ratio (R) is the ratio of a first parameter corresponding to a quantity of valleys of a profile over the sliding surface to a second parameter corresponding to a quantity of peaks of said profile over the sliding surface.

The sliding surface is then both smooth and has cavities intended to be filled with a lubricating fluid.

The seal assembly 10 could comprise an annular ring 17 as described above and the sliding surface 16 is then formed on this annular ring 17.

Parts of the annular ring 17 could be masked so that the surface roughness changes made by the previous manufacturing method would only be effective on the complementary parts, meaning on the zones of the sliding surface 16.

It is also possible to have the sliding surface 16 made up of several subsurfaces, with each subsurface having preset roughness characteristics, which could be different from one to another.

Because of the sliding surface 16 of the seal assembly 10, which has a low arithmetic mean roughness (included between 0.15 μm and 0.5 μm), and which has a large roughness ratio R of the quantity of valleys to the quantity of peaks, the frictional torque or resisting torque of the seal assembly is greatly reduced, while also retaining an excellent seal. Further, the seal joint 15 also has an excellent life for this seal performance.

The invention claimed is:

1. A seal assembly comprising:
   a fixed element;
   a rotating element intended to be rotatable relative to the fixed element around an axis of rotation;
   a seal member comprising an annular reinforcement mounted securely on one element among the fixed element and the rotating element, and a seal secured to the reinforcement, where said seal is made of an elastic material and is in contact with a sliding surface of the other element among the fixed element and the rotating element; and
   an annular ring comprising a cylindrical portion mounted securely to the other element among the fixed element and the rotating element and a flange portion extending radially relative to the axis of rotation from one end of the cylindrical portion, the sliding surface being formed on the cylindrical portion and the flange portion of the annular ring;
   wherein the seal comprises a first lip extending radially from the annular reinforcement out to the cylindrical portion in order to be in contact with the sliding surface belonging to the cylindrical portion, and a second lip extending axially from the annular reinforcement to the flange portion in order to be in contact with the sliding surface belonging to the flange portion;
   wherein the annular ring and the first and second seal lips define an internal volume;
   the seal assembly being characterized in that
   the sliding surface has an arithmetic mean roughness greater than or equal to 0.15 μm and less than 0.5 μm; and
   the sliding surface has a roughness ratio greater than or equal to one, where said roughness ratio is the ratio of a first parameter corresponding to a quantity of valleys of a profile over the sliding surface to a second parameter corresponding to a quantity of peaks of said profile over the sliding surface.

2. The assembly according to claim 1, wherein the first parameter is an Rvk parameter and the second parameter is an Rpk parameter, where said Rvk and Rpk parameters are defined and determined according to the standard ISO 13565.

3. The assembly according to claim 1, wherein the roughness ratio is greater than or equal to 1.5.

4. The assembly according to claim 1, wherein the arithmetic mean roughness is greater than or equal to 0.2 μm and less than 0.3 μm.

5. The assembly according to claim 1, wherein the internal volume is at least partially filled with grease.

6. The assembly according to claim 5, wherein the grease has a kinematic viscosity at 40° C. included between 5 centiStokes and 40 centiStokes.

7. The assembly according to claim 1, wherein the roughness ratio is greater than or equal to 2.

8. A roller bearing comprising a seal assembly according to claim 1, and rolling bodies arranged in a rolling space to allow relative rotation of the rotating element relative to the fixed element around the axis of rotation.

\* \* \* \* \*